(12) United States Patent
Zhu et al.

(10) Patent No.: US 11,239,498 B2
(45) Date of Patent: Feb. 1, 2022

(54) ELECTROLYTIC SOLUTION AND LITHIUM-ION BATTERY

(71) Applicant: CONTEMPORARY AMPEREX TECHNOLOGY CO., LIMITED, Ningde (CN)

(72) Inventors: Jianwei Zhu, Ningde (CN); Chenghua Fu, Ningde (CN); Xiaomei Wang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 158 days.

(21) Appl. No.: 16/390,816

(22) Filed: Apr. 22, 2019

(65) Prior Publication Data

US 2019/0326637 A1    Oct. 24, 2019

(30) Foreign Application Priority Data

Apr. 23, 2018 (CN) .......................... 201810367064.3

(51) Int. Cl.
*H01M 10/0567* (2010.01)
*H01M 10/0525* (2010.01)
*H01M 4/38* (2006.01)
*H01M 4/134* (2010.01)
*H01M 4/02* (2006.01)

(52) U.S. Cl.
CPC ....... *H01M 10/0567* (2013.01); *H01M 4/134* (2013.01); *H01M 4/386* (2013.01); *H01M 10/0525* (2013.01); *H01M 2004/027* (2013.01)

(58) Field of Classification Search
CPC .. H01M 4/134; H01M 4/386; H01M 10/0525; H01M 10/0566; H01M 10/0567; H01M 10/0568; H01M 10/4235; H01M 2004/027; H01M 2300/0025; Y02E 60/10
See application file for complete search history.

(56) References Cited

U.S. PATENT DOCUMENTS

| | | | |
|---|---|---|---|
| 10,218,033 B1 * | 2/2019 | Bhardwaj | H01M 10/0567 |
| 10,756,394 B2 | 8/2020 | Matsuoka et al. | |
| 2006/0281012 A1 * | 12/2006 | Ugawa | H01M 10/0567 429/330 |
| 2013/0059200 A1 * | 3/2013 | Bhat | H01M 10/0567 429/200 |
| 2013/0209896 A1 | 8/2013 | Schroedle et al. | |
| 2015/0118581 A1 | 4/2015 | Takase et al. | |
| 2016/0126582 A1 | 5/2016 | Xiao et al. | |
| 2016/0248121 A1 | 8/2016 | Uematsu et al. | |
| 2016/0268635 A1 | 9/2016 | Cha | |

FOREIGN PATENT DOCUMENTS

| | | | |
|---|---|---|---|
| CN | 102569886 A | | 7/2012 |
| CN | 103078140 A | | 5/2013 |
| CN | 104091967 A | | 10/2014 |
| CN | 107293792 A | | 10/2017 |
| CN | 107408735 A | | 11/2017 |
| CN | 109818064 A | | 5/2019 |
| CN | 111900477 | * | 11/2020 |
| JP | 2003007332 A | | 1/2003 |
| JP | 2010062164 A | | 3/2010 |
| JP | 2010086681 A | | 4/2010 |
| JP | 2014127354 A | | 7/2014 |
| JP | 2015088261 A | | 5/2015 |
| JP | 2016035933 A | | 3/2016 |
| KR | 20160097075 A | | 8/2016 |
| WO | 2015098471 A1 | | 7/2015 |
| WO | WO 2016/159117 | * | 10/2016 |

OTHER PUBLICATIONS

Machine translation of JP 2014-127354, published on Jul. 7, 2014 (Year: 2014).*
Chinese First Office Action Application No. 201810367064.3 dated Jun. 15, 2020, English Translation (First Office Action).
CN 103078140 A, Abstract & Machine Translation.
CN 104091967 A, Abstract & Machine Translation.
CN 107408735 A, US 10,756,394 B2.
JP 2014127354 A, Abstract & Machine Translation.
Japanese Office Action dated Jul. 30, 2020 (with English Machine Translation), Application No. 2019-081808, 7 Pages.
Chinese First Office Action dated Jun. 15, 2020, Application No. 201810367064.3, Applicant Ningde Times New Energy Technology Co., Ltd., 17 Pages.
Japanese Office Action Application No. 2019-081808 dated Jul. 30, 2020, English Machine Translation (Notice of Reasons for Refusal).
CN 109818064 A, Abstract & Machine Translation.
JP 2003007332 A, Abstract & Machine Translation.
JP 2010062164 A, Abstract & Machine Translation of related Japanese Publication JP 2011142112 A.

(Continued)

*Primary Examiner* — Anca Eoff

(74) *Attorney, Agent, or Firm* — Brooks Kushman P.C.

(57) ABSTRACT

The present disclosure relates to the technical field of lithium-ion battery, and particularly, to an electrolytic solution and a lithium-ion battery including the electrolytic solution. The electrolytic solution includes additives, and the additives include an additive A and an additive B. The additive A forms a film on the surface of the positive electrode and effectively prevents interface side reactions at the positive electrode. Comparing with the additive A, the additive B is preferentially reduced to form a film at the negative electrode, avoiding an increase in impedance and deterioration of cycling dynamic performance, etc., caused by film formation of the additive A on the negative electrode. The combination of the additive A and additive B imparts the battery with a reduced gas production, a higher capacity retention rate and a lower impedance at high temperature.

12 Claims, No Drawings

(56) References Cited

OTHER PUBLICATIONS

JP 2010086681 A, Abstract & Machine Translation.
JP 2015088261 A, US 2015/0118581 A1.
JP 2016035933 A, Abstract & Machine Translation.
WO 2015098471 A1, US 2016/0248121 A1.
Chinese Third Office Action (with English Translation), dated May 20, 2021, Application No. 201810367064.3, Applicant Ningde Times New Energy Technology, Co., Ltd., 11 Pages.
Chinese Search Report (with English Translation), dated Jul. 14, 2021, Application No. 201810367064.3, 3 Pages.

* cited by examiner

ELECTROLYTIC SOLUTION AND LITHIUM-ION BATTERY

CROSS-REFERENCE TO RELATED APPLICATIONS

This application claims foreign priority benefits under 35 U.S.C. § 119(a)-(d) to Chinese Patent Application No. 201810367064.3, filed Apr. 23, 2018, which is incorporated by reference herein in its entirety.

TECHNICAL FIELD

The present disclosure relates to the field of energy storage materials, and particularly, to an electrolytic solution and a battery using the electrolytic solution.

BACKGROUND

Lithium-ion batteries are widely used in electric vehicles and consumer electronics due to their advantages of high energy density, high output power, long cycle life and low environmental pollution. The current demands on the lithium-ion batteries include: high voltage, high power, long cycle life, long storage life and excellent safety performance.

Among the lithium-ion batteries, the silicon-based negative electrode material is acknowledged as a promising negative electrode material with commercial prospects due to its advantage of high capacity, such as $Li_{22}Si_5$, which has a theoretical capacity of 4200 mAh/g. The theoretical capacity of this negative electrode material is 11 times that of the current graphite negative electrode material in the market. Moreover, the potential of lithium ion intercalating into silicon (lower than 0.5 V) is lower than a co-intercalation voltage of common solvent molecules but higher than a lithium de-intercalation potential. The silicon material, as a negative electrode, has a disadvantage of poor conductivity, and thus the negative electrode material would continuously intercalate and de-intercalate lithium during the cycling, which causes a sharp volume expansion effect. The volume expansion rate of the material can reach 400% at the end of the cycling, resulting in a separation of the electrode material from the current collector, and seriously affecting the electrical performance of the lithium-ion battery. Therefore, it is urgent to find a suitable additive which can form a dense SEI film with high toughness on the surface of the silicon negative electrode, in order to effectively suppress the volume expansion caused by the intercalation and de-intercalation of the silicon material during the cycling, to prevent the silicon material from exposing a fresh surface due to the volume expansion, and finally to reduce side reactions between the negative electrode material and the electrolytic solution.

SUMMARY

In view of above, a first aspect of the present disclosure provides an electrolytic solution, for forming a dense SEI film with high toughness on surfaces of positive and negative electrode materials and preventing side reactions between the electrode materials and the electrolytic solution.

The electrolytic solution includes an electrolyte, a solvent and additives. The additives include an additive A and an additive B. The additive A is at least one of compounds represented by Formula Ia or compounds represented by Formula Ib, and the additive B is at least one of compounds represented by Formula II:

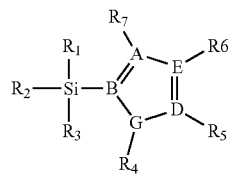

(Ia)

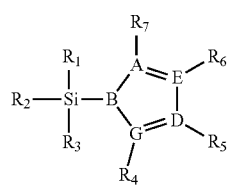

(Ib)

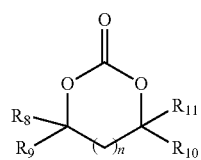

(II)

in which $R_1$, $R_2$, $R_3$, $R_4$, $R_5$, $R_6$, and $R_7$ are each independently selected from the group consisting of hydrogen, halogen, a substituted or unsubstituted $C_1$-$C_{10}$ alkyl, a substituted or unsubstituted $C_1$-$C_{10}$ alkoxy, a substituted or unsubstituted $C_6$-$C_{20}$ aryl, and a substituted or unsubstituted $C_3$-$C_{20}$ heterocyclic group, $R_4$ and $R_5$ are optionally bonded together to form a five-membered or six-membered ring, $R_6$ and $R_7$ are optionally bonded together to form a five-membered or six-membered ring, at least one of A, B, D, E or G is selected from the group consisting of nitrogen (N), oxygen (O) and sulfur (S), the remaining ones of A, B, D, E or G except the at least one are carbon; $R_8$, $R_9$, $R_{10}$ and $R_{11}$ are each independently selected from the group consisting of hydrogen, halogen, and a substituted or unsubstituted $C_1$-$C_6$ alkyl, at least one of $R_8$, $R_9$, $R_{10}$ or $R_{11}$ is halogen, and n is 0, 1, 2, 3, 4, or 5. The substituent of the above groups, if present, is selected from the group consisting of halogen, cyano group, $C_1$-$C_6$ alkyl, $C_2$-$C_6$ alkenyl, $C_1$-$C_6$ alkoxy, and combinations thereof.

A second aspect of the present disclosure provides a lithium-ion battery including a positive electrode, a negative electrode, and the electrolytic solution according to the first aspect. electrolytic solution

DETAILED DESCRIPTION

As required, detailed embodiments are disclosed herein. However, it is to be understood that the disclosed embodiments are merely exemplary and that various alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

In order to clarify the objects, technical solutions and beneficial technical effects of the present disclosure, the present disclosure will be described in detail below with reference to the embodiments. It should be understood that the embodiments described in the present disclosure are merely illustrative, and are not intended to limit the present disclosure. The formulation, proportion, and the like mentioned in the embodiments can be changed according to actual requirements without substantially affecting the results.

The electrolytic solution and lithium-ion battery according to the present disclosure will be described in detail below.

Firstly, the electrolytic solution according to the first aspect of the present application is elaborated.

In order to achieve the purpose of the present disclosure, in an embodiment according to the first aspect of the present disclosure, an electrolytic solution is provided. The electrolytic solution includes an electrolyte, a solvent and additives. The additives include an additive A and an additive B. The additive A is at least one of compounds represented by Formula Ia or compounds represented by Formula Ib, and the additive B is at least one of compounds represented by Formula II:

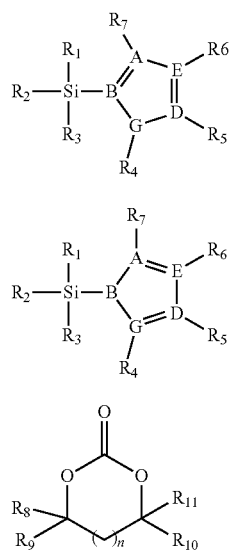

in which, $R_1$, $R_2$, $R_3$, $R_4$, $R_5$, $R_6$, and $R_7$ are each independently selected from the group consisting of hydrogen, halogen, a substituted or unsubstituted $C_1$-$C_{10}$ alkyl, a substituted or unsubstituted $C_1$-$C_{10}$ alkoxy, a substituted or unsubstituted $C_6$-$C_{20}$ aryl, and a substituted or unsubstituted $C_3$-$C_{20}$ heterocyclic group, $R_4$ and $R_5$ are optionally bonded together to form a five-membered or six-membered ring, $R_6$ and $R_7$ are optionally bonded together to form a five-membered or six-membered ring, at least one of A, B, D, E or G is selected from the group consisting of nitrogen (N), oxygen (O) and sulfur (S), the remaining ones of A, B, D, E or G except the at least one are carbon, $R_8$, $R_9$, $R_{10}$ and $R_{11}$ are each independently selected from the group consisting of hydrogen, halogen, and a substituted or unsubstituted $C_1$-$C_6$ alkyl, at least one of $R_8$, $R_9$, $R_{10}$ or $R_{11}$ is halogen, and n is 0, 1, 2, 3, 4, or 5. The substituent of the above groups, if present, is selected from the group consisting of halogen, cyano group, $C_1$-$C_6$ alkyl, $C_2$-$C_6$ alkenyl, $C_1$-$C_6$ alkoxy, and combinations thereof.

The additive A can form a film on the surface of the positive electrode, which effectively isolates the positive electrode material in a strong oxidation state from the electrolytic solution during charging and discharging of the lithium-ion battery, thereby avoiding interface side reactions such as severe oxidative decomposition of the electrolytic solution. At the same time, the additive A prevents HF in the electrolytic solution from corroding the nickel-rich positive material. Comparing with the additive A, the additive B is preferentially reduced to form a film on the surface of the negative electrode, so as to avoid an increase in impedance and deterioration of cycling dynamic performance that are caused by film formation of the additive A on the negative electrode. In addition, the formed SEI film has high toughness and the inorganic components included therein impart the film with high thermal stability. The advantages of the additive A and the additive B are complementary, and thus the battery prepared by combining them has prominent advantages such as good cycling dynamic performance, reduced gas production at high temperature, and lower impedance.

As an improvement of the additive A, the additive A is selected from the group consisting of compounds represented by Formula IA, Formula IC, and Formula ID, and combinations thereof:

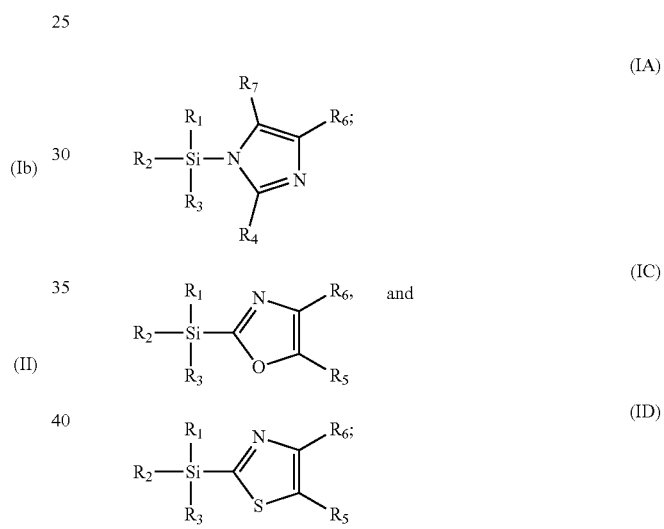

in which, $R_1$, $R_2$, $R_3$, $R_4$, $R_5$, $R_6$ and $R_7$ are each independently selected from the group consisting of hydrogen, halogen, a substituted or unsubstituted $C_1$-$C_{10}$ alkyl, a substituted or unsubstituted $C_1$-$C_{10}$ alkoxy, a substituted or unsubstituted $C_6$-$C_{20}$ aryl, and a substituted or unsubstituted $C_3$-$C_{20}$ heterocyclic group. The substituent of the above groups, if present, is selected from the group consisting of halogen, cyano group, $C_1$-$C_6$ alkyl, $C_2$-$C_6$ alkenyl, $C_1$-$C_6$ alkoxy, and combinations thereof.

As an improvement of the additive A, the additive A is selected from the group consisting of the following compounds and combinations thereof:

N-(trimethylsilyl) imidazole

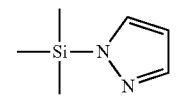

N-(trimethylsilyl)pyrazole (Mol. 2)

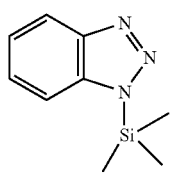

1-(trimethylsilyl)benzotriazole (Mol. 3)

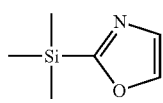

2-(trimethylsilyl)oxazole (Mol. 4)

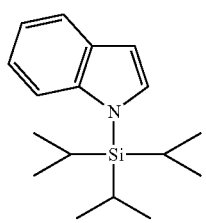

1-(triisopropylsilyl)indole (Mol. 5)

As an improvement of the additive B, at least one of $R_8$, $R_9$, $R_{10}$, or $R_{11}$ is fluorine.

As an improvement of the additive B, the additive B is selected from the group consisting of the following compounds and combinations thereof:

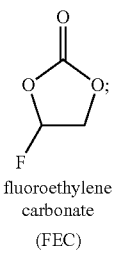
fluoroethylene carbonate (FEC)

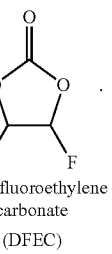
1,2-difluoroethylene carbonate (DFEC)

As an improvement of the electrolytic solution according to the present disclosure, a concentration of the additive A in the electrolytic solution is in a range of 0.01% to 10% by weight, preferably 0.1% to 6% by weight. A lower limit of the range can be 0.01%, 0.05%, 0.1%, 1%, 2%, 3%, 4%, 5%, or 6% by weight, and an upper limit thereof can be 10%, 9%, 8%, 7%, 6%, or 5% by weight. If the concentration of the additive A is too high, a thick SEI film will be formed and thus results in a high impedance, which may affect the dynamic performance of the lithium-ion battery. On the contrary, if the concentration is excessive low, the additive A cannot form an effective SEI film on the material surface, such that the volume expansion of the silicon negative electrode during the cycle and thus fresh surface exposure of the silicon negative electrode caused by the volume expansion cannot be effectively suppressed, thereby leading to more side reactions.

As an improvement of the electrolytic solution according to the present disclosure, a concentration of the additive B in the electrolytic solution is in a range of 0.5% to 30% by weight. A lower limit of the range can be 0.5%, 1%, 3%, 5%, 10%, 12%, 15%, or 18% by weight, and an upper limit thereof can be 30%, 28%, 25%, 22%, 20%, or 16% by weight. An exorbitant concentration of the additive B will aggravate gas production at high temperature conditions and results in a deterioration of the cycling performance of the lithium battery. On the contrary, if the concentration of the additive B is excessively low, an effective SEI film may not be formed on the surface of the silicon negative electrode, and thus the cycling performance of the silicon negative electrode battery fails to be improved.

The concentration of the additive B is dependent on the amount of the silicon material used in the negative electrode. With the increasing of the content of the silicon material, the addition amount of the additive B increases accordingly. When the concentration of the additive B in the electrolytic solution is too low, it is difficult to effectively protect the active interface of the negative electrode, especially active points of the silicon-based negative electrode material, and thus a large number of side reactions would occur. For example, a large amount of reducing gas can be produced and destroys the interface stability, resulting in the deterioration of the cycling performance of the cell. On the contrary, if the concentration of the additive B in the electrolyte is too high, especially under high temperature conditions, during the charging and discharging process of the lithium battery, an oxidative decomposition is carried out between the nickel-rich material in a strong oxidation state and the electrolytic solution when they are in contact and thus the by-product HF is generated, which may cause structural damage to the positive electrode material, leading to the deterioration of the cycling performance of the lithium battery.

As an improvement of the electrolytic solution according to the present disclosure, the additives further include an additive C. The additive C is a cyclic ester containing a sulfur-oxygen double bond represented by Formula III

(III)

A concentration of the additive C in the electrolytic solution is in a range of 0.1% to 5% by weight. A lower limit of the range is 0.1%, 0.3%, 0.5%, or 1%, and an upper limit thereof is 5%, 4%, 3%, or 2%. An exorbitant concentration of the additive C will cause a deterioration of the cycling performance of the lithium battery, while an excessive low concentration cannot significantly improve the cycling life. The additive C is used in combination with the additive A and additive B, in order to ensure a high capacity retention rate of the lithium battery during the cycling, further improve the storage performance of the lithium-ion battery and also enhance the cycling performance of the lithium-ion battery to a certain extent.

As an improvement of the electrolytic solution according to the present disclosure, the organic solvent is selected from the group consisting of ethylene carbonate, propylene carbonate, butylene carbonate, pentenyl carbonate, dimethyl carbonate, diethyl carbonate, dipropyl carbonate, ethyl methyl carbonate, and combinations thereof, or it can be one or more of halogenated derivatives of the above compounds.

In the general formulas of the compounds of the additive A and additive B according to the embodiments of the present disclosure:

$C_1$-$C_{10}$ alkyl can be a chain alkyl, or a cyclic alkyl, and hydrogen on a ring of the cyclic alkyl can be substituted by alkyl. A lower limit of the number of carbon atoms in the alkyl is preferably 1, 2, 3, 4, 5, and an upper limit of the number of carbon atoms in the alkyl is 3, 4, 5, 8, or 10. The chain alkyl having 1 to 6 carbon atoms or the cyclic alkyl having 3 to 8 carbon atoms is preferably selected. Further preferably, the chain alkyl having 1 to 4 carbon atoms or the cyclic alkyl having 5 to 7 carbon atoms is selected. Examples of $C_1$-$C_{10}$ alkyl include: methyl, ethyl, n-propyl, isopropyl, n-butyl, isobutyl, sec-butyl, tert-butyl, n-pentyl, isopentyl, neopentyl, hexyl, 2-methyl-pentyl, 3-methyl-pentyl, 1,1,2-trimethyl-propyl, 3,3-dimethyl-butyl, heptyl, 2-heptyl, 3-heptyl, 2-methylhexyl, 3-methylhexyl, isoheptyl, octyl, nonyl, and decyl.

$C_1$-$C_{10}$ alkoxy is preferably alkoxy having 1 to 6 carbon atoms, and more preferably alkoxy having 1 to 4 carbon atoms. Specific examples of $C_1$-$C_{10}$ alkoxy include methoxy, ethoxy, n-propoxy, isopropoxy, n-butoxy, sec-butoxy, tert-butoxy, n-pentyloxy, isopentyloxy, cyclopentyloxy, and cyclohexyloxy.

$C_6$-$C_{20}$ aryl is, for example, phenyl, phenylalkyl, aryl containing at least one phenyl such as biphenyl, or a fused ring aromatic hydrocarbon group such as naphthyl, anthryl, and phenanthryl. Biphenyl and the fused ring aromatic hydrocarbon group can be substituted with alkyl or alkenyl. Preferably, an aryl group having 6 to 16 carbon atoms is selected; more preferably, an aryl group having 6 to 14 carbon atoms is selected; and still more preferably, an aryl group having 6 to 9 carbon atoms is selected. Specific examples of $C_6$-$C_{20}$ aryl include phenyl, benzyl, biphenyl, p-tolyl, o-tolyl, and m-tolyl.

In the substituted or unsubstituted heterocyclic group, the hetero atom is selected from the group consisting of oxygen, nitrogen, sulfur, phosphorus, boron, etc., and the heterocyclic ring is an aliphatic heterocyclic ring or an aromatic heterocyclic ring. The substituted or unsubstituted heterocyclic group can be a 5-membered or 6-membered heterocyclic group or a benzoheterocyclic group. Preferably, the heterocyclic group having 4 to 10 carbon atoms is selected, and more preferably, the heterocyclic group having 4 to 7 carbon atoms is selected. Specifically examples include furyl, thienyl, pyrrolyl, thiazolyl, imidazolyl, pyridyl, pyrazinyl, pyrimidinyl, pyridazinyl, indolyl, quinolyl, etc.

Halogen is fluorine, chlorine or bromine, and preferably, is fluorine.

Electrolyte Salt

The lithium salts listed as follow can be used as electrolyte salt in the embodiments of the present disclosure.

[Li Salt—Type 1]

This type of Li salt is a "complex salt of Lewis acid and LiF" selected from the group consisting of $LiPF_6$, $LiBF_4$, $LiAsF_6$, $LiSbF_6$, $LiPF_4(CF_3)_2$, $LiPF_3(C_2F_5)_3$, $LiPF_3(CF_3)_3$, $LiPF_3(iso$-$C_3F_7)_3$, $LiPF_5(iso$-$C_3F_7)$, and combinations thereof; preferably, $LiPF_6$, $LiBF_4$, or $LiAsF_6$, and more preferably, $LiPF_6$ or $LiBF_4$.

[Li Salt—Type 2]

This type of Li salt is an "imine or methylated lithium salt" selected from the group consisting of $LiN(SO_2F)_2$, $LiN(SO_2CF_3)_2$, $LiN(SO_2C_2F_5)_2$, $(CF_2)_2(SO_2)_2NLi$ (cyclic), $(CF_2)_3(SO_2)_2NLi$ (cyclic), $LiC(SO_2CF_3)_3$, and combinations thereof; preferably, $LiN(SO_2F)_2$, $LiN(SO_2CF_3)_2$ or $LiN(SO_2C_2F_5)_2$, and more preferably, $LiN(SO_2F)_2$ or $LiN(SO_2CF_3)_2$.

[Li Salt—Type 3]

This type of Li salt is a "lithium salt containing $S(=O)_2O$" selected from the group consisting of $LiSO_3F$, $LiCF_3SO_3$, $CH_3SO_4Li$, $C_2H_5SO_4Li$, $C_3H_7SO_4Li$, lithium trifluoro((methylsulfonyl)oxy) borate (LiTFMSB), lithium pentafluoro((methylsulfonyl)oxy) phosphatel (LiPFMSP), and combinations thereof; and preferably, $LiSO_3F$, $CH_3SO_4Li$, $C_2H_5SO_4Li$, or LiTFMSB.

[Li Salt—Type 4]

This type of Li salt is a "lithium salt containing P=O or Cl=O" selected from the group consisting of $LiPO_2F_2$, $Li_2PO_3F$, $LiClO_4$, and combinations thereof; and preferably, $LiPO_2F_2$ or $Li_2PO_3F$.

[Li Salt—Type 5]

This type of Li salt is a "lithium salt having oxalate ligand as anion" selected from the group consisting of lithium bi[oxalate-O,O'] borate (LiBOB), lithium difluoro[oxalate-O,O'] borate, lithium difluorobis[oxalate-O,O'] phosphate (LiPFO), lithium tetrafluoro[oxalate-O,O'] phosphate, and combinations thereof; and preferably, the Li salt is selected from LiBOB or LiPFO. The lithium salt is preferably selected from the group consisting of $LiPF_6$, $LiPO_2F_2$, $Li_2PO_3F$, $LiBF_4$, $LiSO_3F$, LiTFMSB, $LiN(SO_2F)_2$, $LiN(SO_2CF_3)_2$, $LiN(SO_2C_2F_5)_2$, LiBOB, LiPFO, lithium tetrafluoro[oxalate-O,O'] phosphate, and combinations thereof; and more preferably selected from the group consisting of $LiPF_6$, $LiBF_4$, $LiSO_3F$, LiTFMSB, $LiPO_2F_2$, $LiN(SO_2CF_3)_2$, $LiN(SO_2F)_2$, LiBOB, LiPFO, and combinations thereof. $LiPF_6$ is the most preferable one.

The lithium-ion battery according to the second aspect of the present disclosure is described below.

The lithium-ion battery according to an embodiment of the present disclosure includes a positive electrode plate, a negative electrode plate, a separator disposed between the positive electrode plate and the negative electrode plate, and an electrolytic solution.

The positive electrode includes a positive electrode active material capable of de-intercalating and intercalating lithium ions, and the negative electrode includes a negative electrode active material capable of intercalating and de-intercalating lithium ions.

In some embodiments, the positive electrode active material can be selected from the group consisting of lithium cobalt oxide, lithium nickel oxide, lithium manganese oxide, lithium nickel manganese oxide, lithium nickel cobalt manganese oxide, lithium nickel cobalt aluminum oxide, compounds obtained by adding another transition metal or non-transition metal into the above-mentioned lithium transition metal oxides, and a mixture of any two or more of the above materials. In some embodiments, a layered lithium-containing oxide, a spinel-type lithium-containing oxide, an olivine-type lithium-containing phosphate compound, or the like can be used. However, the positive electrode active material is not limited to the above materials, and any material that is known as a positive electrode active material of a lithium-ion battery can be employed. The positive electrode active material may be used individually or in combination.

In some embodiments, the negative electrode active material is a silicon-based negative electrode material, and the silicon-based material is selected from the group consisting of elemental silicon, silicon oxide, silicon carbon composite, silicon alloy, and combinations thereof.

In the battery described above, the separator is not particularly limited to a specific species, and can be any separator material used in the existing batteries, such as polyethylene, polypropylene, polyvinylidene fluoride, and a multilayer composite film thereof, which is not specifically limited herein.

The electrolytic solution is the electrolytic solution according to the first aspect.

EMBODIMENTS

The following embodiments are several embodiments of the lithium-ion battery, but the present disclosure is not limited thereto. The present disclosure is further described in detail in combination with the following embodiments of lithium-ion batteries. It should be understood that these embodiments are not intended to limit the scope of the present disclosure. The reagents, materials and instruments used in the embodiments and comparative examples are commercially available unless otherwise specified.

Embodiment 1

Lithium-ion batteries (abbreviated as batteries) S1 are prepared according to the following method:

(1) Preparation of Positive Electrode Plate

Lithium nickel cobalt manganese oxide ($LiNi_{0.8}Co_{0.1}Mn_{0.1}O_2$), a binder (polyvinylidene fluoride), a conductive agent (conductive carbon black) were mixed at a weight ratio of 98:1:1, and N-methyl pyrrolidone (NMP) was added. The mixture was stirred under a vacuum mixer until the system became uniform and transparent, and a positive electrode slurry was obtained. The positive electrode slurry was uniformly coated on an aluminum foil having a thickness of 12 μm; the aluminum foil was air-dried at room temperature, then transferred into an oven at 120° C. to be dried for 1 hour, and a positive electrode plate was obtained after cold-pressing and cutting.

(2) Preparation of Negative Electrode Plate

A silicon-carbon composite, a conductive agent (conductive carbon black), a binder of polyacrylate were mixed at a weight ratio of 98:1:1, after adding the deionized water, the mixture was stirred in a vacuum mixer to obtain a negative electrode slurry. The negative electrode slurry was uniformly coated on a copper foil. The copper foil was air-dried at room temperature, transferred to an oven at 120° C. to be dried for 1 hour, and a negative electrode plate was obtained after cold-pressing and cutting.

(3) Preparation of Electrolytic Solution

In a drying room, EC and DEC, which had been subjected to rectification and dehydration purification treatment, were uniformly mixed to form an organic solvent, following by adding lithium salt LiPF6 and the additives, and the mixture is uniformly mixed to obtain an electrolytic solution. In the electrolytic solution, the lithium salt has a concentration of 1 mol/L and accounts for 12.5% by weight with respect to the total mass of the electrolytic solution. The weight ratio of EC, EMC and DEC is EC:EMC:DEC=1:1:1. The specific types and concentrations of the additives are shown in Table 1.

(4) Preparation of Lithium-Ion Battery

The positive and negative electrode plates, which had been cut in a conventional manner, as well as the separator were stacked in a sequence that the separator is disposed between the positive electrode plate and negative electrode plate as an isolation, and they were wound to obtain a bare cell. The bare cell was placed in a packaging foil and the electrolytic solution prepared as above was injected into the dried battery. After vacuum encapsulation, still standing, formation, shaping, and the like, a lithium-ion battery (S1) was obtained.

Embodiments 2 to 19 (Embodiment Battery No. S2 to S19) and Comparative Examples 1 to 8 (Comparative Battery No. D1 to D8) were prepared by the same method as mentioned in Embodiment 1, except the formulation of the electrolytic solution and the specific types and concentrations of the additives, referring to Table 1.

TABLE 1

Types and Amounts of Additives in Electrolytic Solutions of Comparative Examples 1-8 and Embodiments 1-19

| | Type and Amount (%) of Additive | | | | | | | |
| --- | --- | --- | --- | --- | --- | --- | --- | --- |
| | Additive A | | | | | Additive B | | Additive C |
| Battery No. | Mol. 1 | Mol. 2 | Mol. 3 | Mol. 4 | Mol. 5 | FEC | DFEC | DTD |
| D1 | — | — | — | — | — | — | — | — |
| D2 | — | — | — | — | — | 15 | — | — |
| D3 | — | — | — | — | — | — | 15 | — |
| D4 | — | — | — | — | — | 15 | — | 1 |
| D5 | 0.5 | — | — | — | — | — | — | — |
| D6 | 0.25 | 0.25 | — | — | — | — | — | — |
| D7 | — | 0.5 | — | — | — | — | — | — |
| D8 | — | — | 0.5 | — | — | — | — | — |
| D9 | 0.005 | — | — | — | — | 15 | — | — |
| D10 | 15 | — | — | — | — | 15 | — | — |
| D11 | 5 | — | — | — | — | 0.2 | — | — |
| D12 | 5 | — | — | — | — | 40 | — | — |
| S1 | 0.3 | — | — | — | — | 15 | — | — |
| S2 | 0.5 | — | — | — | — | 15 | — | — |
| S3 | 1 | — | — | — | — | 15 | — | — |
| S4 | 0.25 | 0.25 | — | — | — | 15 | — | — |
| S5 | 2 | — | — | — | — | 15 | — | — |
| S6 | 5 | — | — | — | — | 15 | — | — |
| S7 | 0.5 | — | — | — | — | 15 | — | 1 |
| S8 | 0.5 | — | — | — | — | 30 | — | — |
| S9 | 0.5 | — | — | — | — | 0.5 | — | — |

TABLE 1-continued

Types and Amounts of Additives in Electrolytic Solutions of Comparative
Examples 1-8 and Embodiments 1-19

| | Type and Amount (%) of Additive | | | | | | | |
|---|---|---|---|---|---|---|---|---|
| | Additive A | | | | | Additive B | | Additive C |
| Battery No. | Mol. 1 | Mol. 2 | Mol. 3 | Mol. 4 | Mol. 5 | FEC | DFEC | DTD |
| S10 | — | 0.5 | — | — | — | 15 | — | — |
| S11 | — | — | 0.5 | — | — | 15 | — | — |
| S12 | — | 0.5 | — | — | — | — | 0.5 | — |
| S13 | — | 0.5 | — | — | — | — | 15 | — |
| S14 | — | 0.5 | — | — | — | — | 30 | — |
| S15 | — | — | 0.5 | — | — | — | 15 | — |
| S16 | — | — | 0.5 | — | — | — | 0.5 | — |
| S17 | — | — | 0.5 | — | — | — | 30 | — |
| S28 | — | — | — | 0.5 | — | 15 | — | — |
| S19 | — | — | — | — | 0.5 | 15 | — | — |
| S20 | 0.01 | — | — | — | — | 5 | — | — |
| S21 | — | 0.01 | — | — | — | 5 | — | — |
| S22 | — | — | 0.01 | — | — | — | 5 | — |
| S23 | — | — | — | 0.01 | — | — | 5 | — |
| S24 | — | — | — | — | 0.01 | — | 5 | — |
| S25 | 10 | — | — | — | — | 2 | 5 | — |
| S26 | — | 10 | — | — | — | 5 | 5 | — |
| S27 | — | — | 10 | — | — | 10 | 10 | — |
| S28 | — | — | — | 10 | — | 10 | 15 | — |
| S29 | — | — | — | — | 10 | 15 | 15 | — |
| S30 | 2 | 2 | 1 | 1 | 2 | — | 12 | — |
| S31 | 1 | 1 | 1 | — | — | 3 | — | — |
| S32 | — | — | 2 | 2 | 2 | 3 | 3 | — |

Notes:
"—" in Table 1 indicates no additive;
DTD: ethylene sulfate;
Mol. 1: N-(trimethylsilyl) imidazole;
Mol. 2: N-(trimethylsilyl)pyrazole;
Mol. 3: 1-TMS-1H-benzotriazole;
Mol. 4: 2-(Trimethylsilyl)oxazole;
Mol. 5: 1-(triisopropylsilyl)indole.

Performance Tests

Storage Performance of Lithium-Ion Battery at High Temperature Test

The batteries obtained in Comparative Examples 1-8 and embodiments 1-19 were each subjected to the following test: the battery stood still at 25° C. for 30 minutes, then charged to 4.2V with at a constant current of 1 C, then charged to 0.05 C at the constant voltage of 4.2V and stood still for 5 minutes. After a storage at 70° C. for 10 days with a fixture, the volume expansion ratio of the battery was measured. The relevant test results are shown in Table 2, in which a thickness expansion ratio of the battery is calculated according to the following equation:

volume expansion ratio=[(volume after storage−volume before storage)/volume before storage]×100%.

Cycling Test of Lithium-Ion Battery at 25° C.

The batteries obtained in Comparative Examples 1-8 and embodiments 1-19 were each subjected to the following test: at 25° C., as a first cycle, the battery was charged to 4.2 V with a constant current of 1 C, then charged to a current of 0.05 C at the constant voltage, and discharged to 2.5V with a constant current of 1 C. Under the above conditions, the battery was subjected to a number of cycles, and the capacity retention rates of the battery after 200 cycles, 400 cycling, and 600 cycles were respectively calculated according to the following equation. Relevant test data was listed in Table 2.

capacity retention ratio after cycling=(discharge capacity of a corresponding cycle/discharge capacity of the first cycle)×100%.

It should be noted that, in Table 2, the data of the capacity retention ratio after cycling of the batteries S1 to S19 and the batteries D1 to D8 indicate the state of the capacity retention rate of the corresponding battery.

TABLE 2

Cycling capacity retention ratio of batteries obtained in
Comparative Examples 1-8 and Embodiments 1-19 at 25° C.

| | Cycling capacity retention rate at 25° C. | | |
|---|---|---|---|
| Battery No. | 200 cycles | 400 cycles | 600 cycles |
| D1 | 77.60% | 65.10% | 38.50% |
| D2 | 95.41% | 91.40% | 80.89% |
| D3 | 95.05% | 90.90% | 80.10% |
| D4 | 94.80% | 90.10% | 79.80% |
| D5 | 80.60% | 69.30% | 50.20% |
| D6 | 81.40% | 71.10% | 49.90% |
| D7 | 80.80% | 70.60% | 48.30% |
| D8 | 79.40% | 69.70% | 51.90% |
| D9 | 94.50% | 90.80% | 81.10% |
| D10 | 81.30% | 73.40% | 57.20% |
| D11 | 80.60% | 69.30% | 50.20% |
| D12 | 89.20% | 88.80% | 77.60% |
| S1 | 92.80% | 87.60% | 76.60% |
| S2 | 95.90% | 91.10% | 80.90% |
| S3 | 94.80% | 90.40% | 79.90% |
| S4 | 93.90% | 90.90% | 80.10% |
| S5 | 93.80% | 89.50% | 79.90% |
| S6 | 93.90% | 89.10% | 78.90% |
| S7 | 94.50% | 90.80% | 79.10% |
| S8 | 94.80% | 91.30% | 80.30% |
| S9 | 95.00% | 91.10% | 79.60% |

TABLE 2-continued

Cycling capacity retention ratio of batteries obtained in
Comparative Examples 1-8 and Embodiments 1-19 at 25° C.

| Battery No. | Cycling capacity retention rate at 25° C. | | |
|---|---|---|---|
| | 200 cycles | 400 cycles | 600 cycles |
| S10 | 94.70% | 90.90% | 80.40% |
| S11 | 93.90% | 90.70% | 80.10% |
| S12 | 94.10% | 90.30% | 80.00% |
| S13 | 93.80% | 91.10% | 80.70% |
| S14 | 94.10% | 90.90% | 79.90% |
| S15 | 93.90% | 91.60% | 80.00% |
| S16 | 93.50% | 90.60% | 80.10% |
| S17 | 94.00% | 90.90% | 80.50% |
| S18 | 93.80% | 90.20% | 79.90% |
| S19 | 94.00% | 90.40% | 80.20% |
| S20 | 94.20% | 89.90% | 80.10% |
| S21 | 95.20% | 90.40% | 80.80% |
| S22 | 94.90% | 90.10% | 79.90% |
| S23 | 93.80% | 89.80% | 80.30% |
| S24 | 94.20% | 89.40% | 80.80% |
| S25 | 85.20% | 80.80% | 61.80% |
| S26 | 86.20% | 79.80% | 62.40% |
| S27 | 85.70% | 81.80% | 63.50% |
| S28 | 86.10% | 80.80% | 64.20% |
| S29 | 85.90% | 79.90% | 62.90% |
| S30 | 84.20% | 77.80% | 68.60% |
| S31 | 83.20% | 78.80% | 65.60% |
| S32 | 93.90% | 89.80% | 79.90% |

Storage Test of Lithium-Ion Battery at 70° C.

The batteries S1-S19 and the batteries D1-D8 were each tested as follows: the lithium-ion battery was charged to 4.2V at a constant current of 1 C at room temperature, following by being charged to a current of 0.05 C with a constant voltage of 4.2V, and then the volume $V_0$ of the battery is measured; and then the lithium-ion battery was placed in an incubator at 70° C. for 10 days storage. During this period, the battery was taken out on the $n^{th}$ day to record its volume $V_n$. The volume expansion ratio of the lithium-ion battery on the $10^{th}$ day was calculated according to the following equation, and the results are shown in Table 3.

volume expansion ratio (%) of lithium-ion battery after high temperature storage for $n$ days=($Vn-V0$)/$V0$×100%, where $n$ is the number of days of high temperature storage of the lithium-ion battery.

TABLE 3

Storage Volume Expansion Ratio of Batteries of Comparative
Examples 1-8 and Embodiments 1-19 at 70° C.

| Battery No. | Storage Volume Expansion Ratio at 70° C. | | | |
|---|---|---|---|---|
| | 2 days | 5 days | 8 days | 10 days |
| D1 | 19.90% | 34.80% | 42.60% | 56.90% |
| D2 | 17.10% | 29.10% | 34.20% | 42.30% |
| D3 | 18.70% | 30.20% | 33.70% | 42.10% |
| D4 | 16.90% | 26.60% | 28.50% | 36.80% |
| D5 | 8.90% | 12.80% | 17.80% | 20.80% |
| D6 | 8.70% | 11.50% | 17.10% | 19.10% |
| D7 | 7.90% | 12.10% | 17.70% | 19.70% |
| D8 | 8.80% | 12.50% | 17.10% | 20.40% |
| D9 | 16.60% | 27.10% | 33.20% | 40.30% |
| D10 | 8.10% | 10.50% | 14.10% | 18.40% |
| D11 | 8.00% | 12.50% | 16.10% | 17.40% |
| D12 | 9.80% | 13.50% | 18.10% | 22.40% |
| S1 | 8.30% | 12.90% | 14.70% | 18.10% |
| S2 | 7.60% | 12.80% | 13.80% | 18.20% |
| S3 | 6.80% | 11.40% | 12.90% | 17.20% |
| S4 | 7.40% | 12.00% | 13.20% | 18.80% |
| S5 | 7.20% | 11.90% | 13.60% | 17.70% |
| S6 | 6.50% | 10.50% | 12.80% | 17.20% |
| S7 | 6.70% | 9.40% | 13.30% | 19.00% |
| S8 | 7.10% | 10.90% | 13.70% | 20.10% |
| S9 | 7.20% | 11.10% | 13.90% | 20.10% |
| S10 | 7.10% | 11.50% | 13.80% | 20.20% |
| S11 | 6.90% | 11.30% | 14.20% | 19.70% |
| S12 | 7.20% | 11.30% | 14.30% | 20.30% |
| S13 | 7.30% | 11.20% | 14.80% | 19.90% |
| S14 | 6.90% | 10.60% | 15.00% | 20.70% |
| S15 | 7.20% | 10.90% | 14.80% | 20.10% |
| S16 | 7.40% | 11.20% | 14.70% | 20.00% |
| S17 | 7.80% | 12.30% | 15.40% | 21.30% |
| S18 | 7.60% | 12.10% | 14.30% | 19.80% |
| S19 | 7.80% | 12.70% | 13.80% | 19.90% |
| S20 | 16.80% | 28.10% | 32.80% | 40.30% |
| S21 | 17.60% | 27.60% | 33.10% | 41.30% |
| S22 | 16.90% | 26.70% | 32.20% | 40.30% |
| S23 | 18.10% | 27.80% | 34.00% | 42.30% |
| S24 | 17.10% | 27.10% | 32.90% | 42.90% |
| S25 | 8.10% | 10.50% | 14.60% | 18.40% |
| S26 | 7.10% | 9.00% | 11.70% | 16.80% |
| S27 | 8.10% | 10.50% | 12.80% | 17.10% |
| S28 | 8.10% | 10.50% | 12.10% | 16.20% |
| S29 | 8.10% | 10.50% | 13.70% | 16.40% |
| S30 | 8.60% | 10.80% | 13.90% | 16.90% |
| S31 | 7.80% | 12.00% | 14.10% | 18.90% |
| S32 | 8.20% | 12.80% | 13.30% | 16.10% |

It can be seen from Table 2 that, compared with the batteries D2 to D4 in which only the additive B is added, the batteries S2 to S32, in which both the additive A and the additive B are added, have substantially same cycling capacity retention rates at 25° C. However, when compared with the batteries D5 to D8 in which only the additive A is added, the batteries S2 to S32 have significantly higher cycling capacity retention rates at 25° C. This indicates that, when a sufficient amount of additive B is added as a silicon negative electrode film-forming additive, the introduction of a reasonable amount of additive A does not have a significant influence on the cycling performance of the lithium battery at 25° C.

Table 3 shows the volume expansion ratios of the samples D1 to D8 and S1 to S19 after the storage at 70° C. for 10 days. It can be seen from Table 3 that each of the batteries S1-S32 having both the additive A and the additive B has a low volume expansion ratio after the storage at high temperature. It can be seen from S2 to S4 and S7 to S19 that the combination (including mixing) of the additive A and the additive B can successfully solve the serious gas production problem caused by film-forming additives (for example, the additive 13). In addition, with the increasing concentration of the additive B, the gas production at high temperature in Embodiments S3, S5, and S6 is effectively suppressed. When the concentration of the additive A is 1%, as illustrated in Embodiment S3, the gas production at 70° C. of the cell was significantly suppressed, but the cycling performance at 25° C. exhibits an accelerated fading tendency. In particular, when the additive A is added to reach a high concentration, an excessively thick SEI film can be formed on the negative electrode, which can significantly reduce the gas production at 70° C., but the formed thick film can also increase Direct Current Resistance (DCR) of the cell and accelerate the deterioration of the 25° C. cycling performance of the lithium battery.

Generally, the amount of the film-forming additive (for example, the additive B) is related to the composition of the negative electrode material of the cell design system. For a cell with a high energy density, the higher concentration of silicon and silicon-based materials requires more film-forming additive (the additive B). It can be found from Embodiments S9, S12 and S16 that a stable SEI film can be formed even if a small amount of the additive B is added to the electrolytic solution system, the gas production can effectively suppressed by the introduction of the additive A, and the lithium batteries demonstrate the same cycling performance at 25° C.

In addition, the combination of the additive C (ethylene sulfate) with compounds such as the additives A and B can further maintain the capacity retention rate during cycling. In summary, in the present disclosure, the additive A, as a gas generation inhibitor, and the additive B, as a film forming agent, are used in combination in the electrolytic solution, the prepared lithium-ion battery can significantly suppress the storage gas production at high temperature (70° C.), while having an unchanged cycling performance at 25° C.

The preferable embodiments of the present disclosure described above are not intended to limit the claims. Those skilled in the art can make various modifications without departing from the concept of the present disclosure. The protection scope of the present disclosure is defined by the claims.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. An electrolytic solution comprising an electrolyte, a solvent and additives, the additives comprising an additive A and an additive B, the additive A being at least one of compounds represented by Formula Ia, the additive B being at least one of compounds represented by Formula II:

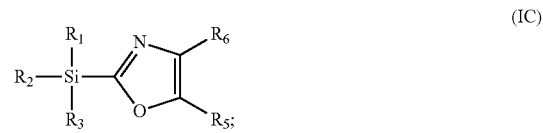

(Ia)

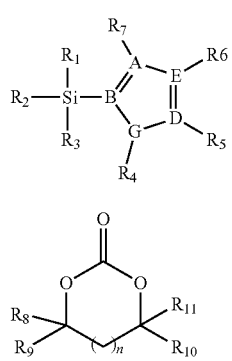

(II)

wherein $R_1$, $R_2$, $R_3$, $R_4$, $R_5$, $R_6$, and $R_7$, when present, are each independently selected from the group consisting of hydrogen, halogen, a substituted or unsubstituted $C_1$-$C_{10}$ alkyl, a substituted or unsubstituted $C_1$-$C_{10}$ alkoxy, a substituted or unsubstituted $C_6$-$C_{20}$ aryl, and a substituted or unsubstituted $C_3$-$C_{20}$ heterocyclic group, $R_4$ and $R_5$ are optionally bonded together to form a five-membered or six-membered ring, $R_6$ and $R_7$ are optionally bonded together to form a five-membered or six-membered ring, at least one of A, B, D, E or G is selected from the group consisting of nitrogen and oxygen, while the remains are carbon;

$R_8$, $R_9$, $R_{10}$ and $R_{11}$ are each independently selected from the group consisting of hydrogen, halogen, and a substituted or unsubstituted $C_1$-$C_6$ alkyl, at least one of $R_8$, $R_9$, $R_{10}$ or $R_{11}$ is halogen, and n is 0, 1, 2, 3, 4, or 5, wherein the substituent of the above groups, if present, is selected from the group consisting of halogen, cyano group, $C_1$-$C_6$ alkyl, $C_2$-$C_6$ alkenyl, $C_1$-$C_6$ alkoxy, and combinations thereof.

2. The electrolytic solution according to claim 1, wherein at least one of $R_8$, $R_9$, $R_{10}$, or $R_{11}$ is fluorine.

3. The electrolytic solution according to claim 1, wherein the additive A is represented by Formula IC:

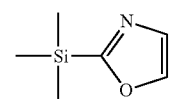

(IC)

wherein $R_1$, $R_2$, $R_3$, $R_5$, and $R_6$ are each independently selected from the group consisting of hydrogen, halogen, a substituted or unsubstituted $C_1$-$C_{10}$ alkyl, a substituted or unsubstituted $C_1$-$C_{10}$ alkoxy, a substituted or unsubstituted $C_6$-$C_{20}$ aryl, and a substituted or unsubstituted $C_3$-$C_{20}$ heterocyclic group, the substituent of the above groups, if present, being selected from the group consisting of halogen, cyano group, $C_1$-$C_6$ alkyl, $C_2$-$C_6$ alkenyl, $C_1$-$C_6$ alkoxy, and combinations thereof.

4. The electrolytic solution according to claim 3, wherein the additive A is:

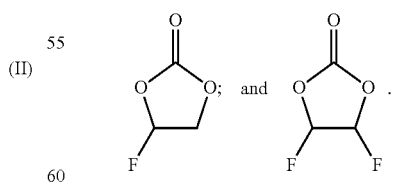

5. The electrolytic solution according to claim 1, wherein the additive B is selected from the group consisting of the following compounds, and combinations thereof:

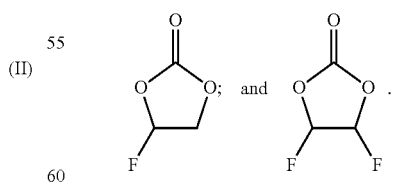

6. The electrolytic solution according to claim 1, wherein a concentration of the additive A in the electrolytic solution is in a range of 0.01% to 10% by weight.

7. The electrolytic solution according to claim 1, wherein a concentration of the additive B in the electrolytic solution is in a range of 0.5% to 30% by weight.

8. The electrolytic solution according to claim 1, wherein the additives further comprise an additive C, the additive C being one or more cyclic esters containing a sulfur-oxygen double bond represented by Formula III, where n is 2, 3, 4, 5, 6, or 7.

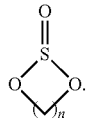

(III)

9. The electrolytic solution according to claim 1, wherein the electrolyte is selected from the group consisting of $LiPF_6$, $LiBF_4$, $LiN(SO_2F)_2$, $LiN(CF_3SO_2)_2$, $LiClO_4$, $LiAsF_6$, $LiB(C_2O_4)_2$, $LiBF_2(C_2O_4)$, $LiN(SO_2R_F)_2$, $LiN(SO_2F)(SO_2R_F)$, and combinations thereof, wherein $R_F$ is $C_{n'}F_{2n'+1}$, and n' is an integer selected from 1 to 10.

10. A lithium-ion battery, comprising
a positive electrode plate;
a negative electrode plate;
a separator disposed between the positive electrode plate and the negative electrode plate; and
the electrolytic solution according to claim 1.

11. The lithium-ion battery according to claim 10, wherein the negative electrode plate comprises a silicon-based negative electrode active material.

12. The electrolytic solution according to claim 6, wherein the concentration of the additive A in the electrolytic solution is in a range of 0.1% to 6% by weight.

* * * * *